United States Patent
van der Knokke

(10) Patent No.: US 6,364,533 B1
(45) Date of Patent: Apr. 2, 2002

(54) SHEET-METAL CAGE FOR A ROLLING BEARING

(75) Inventor: Henri van der Knokke, Niederwerrn (DE)

(73) Assignee: Fag Oem und Handel AG (DE)

( * ) Notice: Subject to any disclaimer, the term of this patent is extended or adjusted under 35 U.S.C. 154(b) by 0 days.

(21) Appl. No.: 09/607,688

(22) Filed: Jun. 30, 2000

(30) Foreign Application Priority Data

Jul. 2, 1999 (DE) .......................... 199 30 658

(51) Int. Cl.$^7$ .................... F16C 33/46; F16C 33/56
(52) U.S. Cl. .................. 384/572; 384/573; 384/576; 384/578
(58) Field of Search ................... 384/572, 573, 384/575, 576, 577, 578, 579, 580

(56) References Cited

U.S. PATENT DOCUMENTS

| | | | | |
|---|---|---|---|---|
| 3,495,889 A | * | 2/1970 | Nisbet et al. | ........... 384/526 X |
| 3,801,172 A | * | 4/1974 | Veglia | ......................... 384/578 |
| 4,435,024 A | * | 3/1984 | Tagawa et al. | ............. 384/576 |
| 5,743,659 A | * | 4/1998 | Stewart | ...................... 384/573 |

FOREIGN PATENT DOCUMENTS

| | | | |
|---|---|---|---|
| DE | 1069433 | 11/1959 | |
| DE | 1805265 | 5/1970 | |
| DE | 7034682.6 | 9/1970 | |
| DE | 8008271 | 3/1980 | |
| DE | 4222185 A1 | * 1/1994 | ................. 384/576 |
| FR | 2649766 A1 | * 1/1991 | ................. 384/578 |

* cited by examiner

*Primary Examiner*—Thomas R. Hannon
(74) *Attorney, Agent, or Firm*—Ostrolenk, Farber, Gerb & Soffen, LLP

(57) ABSTRACT

A metal window cage for a rolling bearing and supporting cylinder rollers. The cage having at least one ladder-shaped bent segment which is bent around to define the window cage. A joint is formed at adjacent cage segment ends which are interlocked in a dovetail shape lock at the segment ends. A connecting element connects the segment ends. The crosspieces at intervals along the cage segment and the connecting element at the joint are encapsulated by being molded over. Cylinder roller retaining clips are provided at the connecting element at the segment ends at the joint and also at the crosspieces between neighboring windows for cylinder rollers. The clips project radially inwardly to prevent the rollers from leaving the cage prior to installation of the cage and rollers in a bearing. The crosspieces and clips there are also molded over to retain them at the cage.

9 Claims, 6 Drawing Sheets

SHEET-METAL CAGE FOR A ROLLING BEARING

FIELD OF THE INVENTION

The invention relates to a sheet-metal cage for a rolling bearing.

BACKGROUND OF THE INVENTION

Like all cages used in rolling bearings, the sheet-metal cage has the tasks of guiding the rolling elements and of keeping the rolling elements at a distance from one another. To also achieve a high basic load rating of the rolling bearing, as many of the rolling elements as possible should be accommodated in the rolling bearing. A large reference circle of the cage makes it possible to minimize the distance between the rolling elements, since the cage cross-piece lies outside the center of the rolling elements. To make it possible in this design, for example in a cylindrical roller bearing, for the rolling elements to still be held, e.g., against falling out during bearing assembly, plastic retaining clips are additionally used. The plastic retaining clips just have the task of holding the rolling elements during assembly of the rolling bearing. During operation of the rolling bearing, the rolling elements are guided only by the sheet-metal cage.

Such a cage is shown in DE-U 7034682. The disadvantage of this solution is that additional retaining clips are used, which have to be fitted individually after producing the cage. A further disadvantage of this arrangement is that the snap-in connection of the retaining clips does not represent a secure connection in all operating states of the rolling bearing. The retaining clips may fall out of the cage during operation.

DE 1805265 C3 shows a cage which is produced by being punched out from a sheet-metal strip combined with bending the ends around and welding the ends together.

In this cage design, it is not possible to position the reference circle outside the center of the rolling elements.

SUMMARY OF THE INVENTION

It is consequently the object of the invention when designing a sheet-metal cage to combine maximum basic bearing load rating with minimized production costs. The invention concerns a metal window cage for a rolling bearing supporting cylinder rollers. The cage has at least one ladder-shaped bent segment bent around to define the window cage. Joints are formed at adjacent cage segment ends which are interlocked in a dovetail shape lock at crosspiece regions at the segment ends. The crosspiece regions at the joints are encapsulated with a connecting element to permanently connect the segment ends.

Cylinder roller retaining clips are molded at the connecting elements at the segment ends at the joints and also at the crosspieces between neighboring cylinder rollers, and the clips project radially inwardly to prevent the rollers from leaving the cage prior to installation of the cage and rollers in a bearing.

The major advantage of the invention is that it dispenses with the "welding" operation at the joint after the sheet-metal cage or sheet-metal cage segments have been bent around, and it replaces that connection by using plastic to connect the ends of the sheet-metal cage. During the encapsulation or molding in plastic, all of the retaining clips are simultaneously molded on at the connecting point and at the cross-pieces using one mold. This avoids fitting of the individual plastic retaining clips after the sheet-metal cage has been produced.

A further advantage of the cage of the invention is its positive interlocking of the joined ends of the cage at the joint with the preferred interlocking design being dovetail-shaped. The interlocking form positively absorbs the tensile and compressive stresses occurring during operation of the sheet-metal cage. As a result, the connecting element at the joint is not subjected to additional loading.

DESCRIPTION OF A PREFERRED EMBODIMENT

Figure 4:
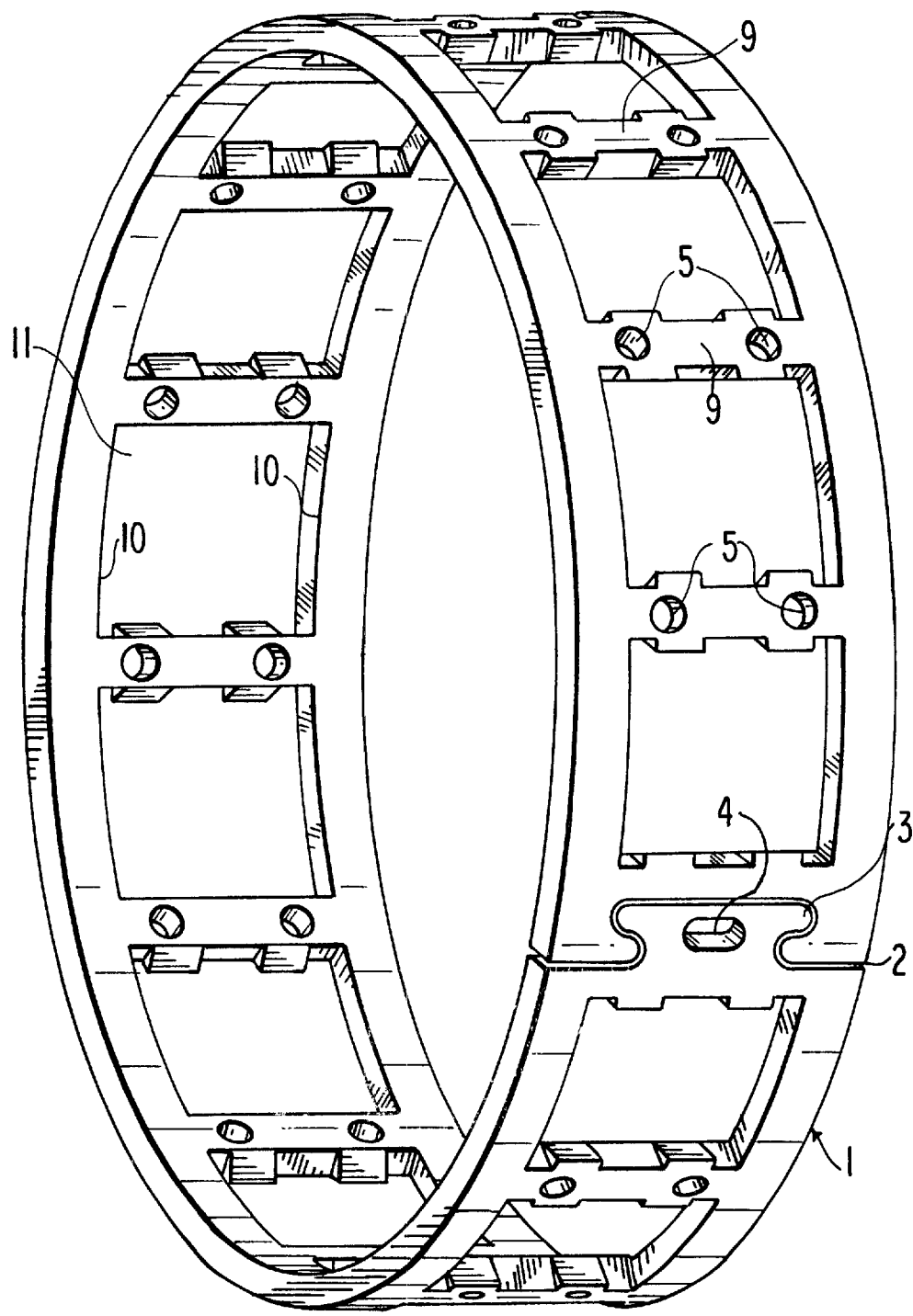
FIG. 4 is a perspective view of the metal cage after it has been bent around and before rolling element retainers are applied.

FIG. 4 shows a single piece or single segment sheet metal steel cage defined by lateral side pieces or webs or rails 10 joined by circumferentially spaced apart cross pieces 9 that define cage windows 11 for receiving cylinder rollers 8 and give the cage a ladder shape.

Figure 1:
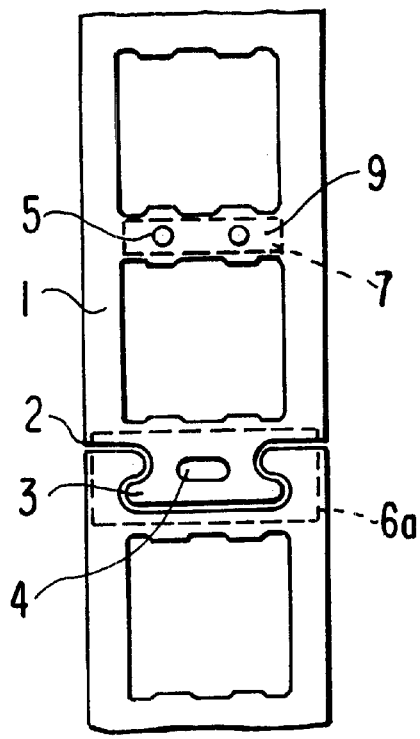
FIG. 1 is a plan of a fragment of a sheet-metal cage according to the invention at the closure between cage segment ends after the cage has been bent around.

FIGS. 1 and 4 show a bent around joined together sheet-metal cage 1 before connectings element 6a which includes retaining clips 6b (FIG. 2) and before retaining clips 7 (FIG. 2) are applied to the cage at all of the cross-pieces 9 extending across the cage width between the rails 10.

There is an interlocked connection 3 at the joint 2 between segment ends of the cage. If the cage is assembled from more than one cage segment, there would be a respective joint between the abutting ends of adjacent segments. For example, connection 3 is a dovetail connection with a projection from one segment end received in a complementary shape notch in the adjoining segment end.

A base area to be covered over by each below described connecting elements 6a and a base area to be covered over by the below described retaining clip 7 are both represented by dashed lines in FIG. 1. The connecting elements 6a and retaining clips 6b and the retaining clips 7 are positively held through the clearance openings 4 and 5 which extend radially through the cage at the cross-pieces.

Figure 7:
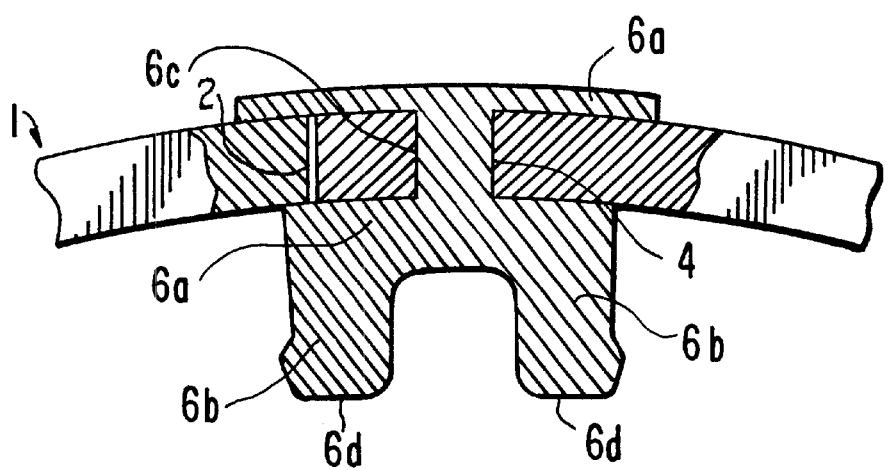
FIG. 7 is a side cross section showing a retaining clip embodiment.
Figure 2:
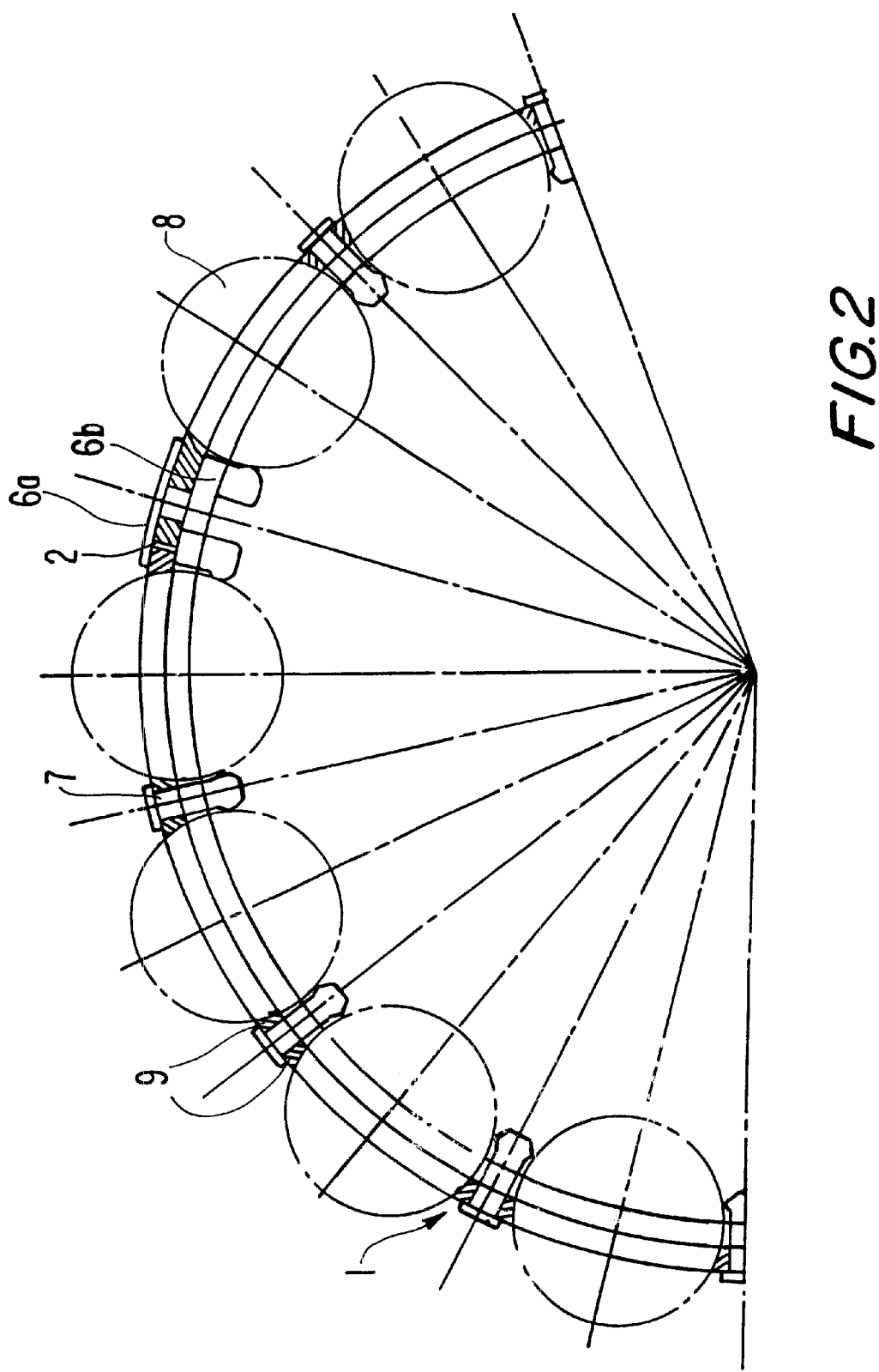
FIG. 2 is a side view of an arcuate segment of a sheet-metal cage according to the invention at the closure.
Figure 5:
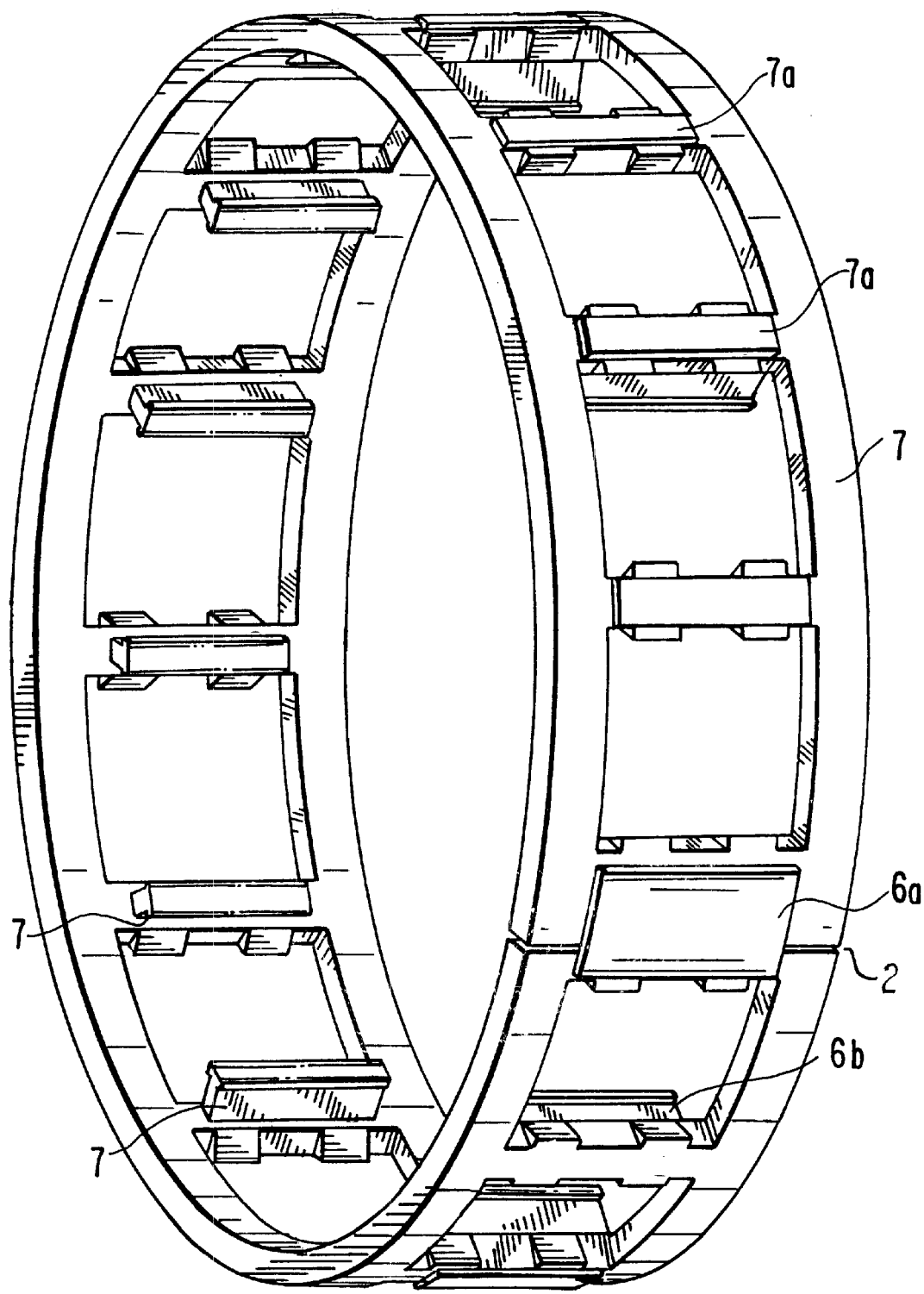
FIG. 5 is a perspective view after rolling element retainers have been applied.

FIGS. 2, 5 and 7 show one of the retaining clips 6b at the joint 2b. The adjacent ends of the cage segments protrude circumferentially at the joint 2 into the narrowed connecting web region 6c of the generally H-shaped (in the radial direction) connecting element 6a which includes retaining clips 6b that project radially inwardly, as shown in FIG. 7. As seen in FIGS. 1, 4 and 7, the clearance opening 4 that receives the web region 6c is narrower than the connecting element 6a and the clips 6b, so that the web region 6c is also both narrower in the lateral direction and thinner in the circumferential direction than the connecting element 6a and the clips 6b.

Figure 6:
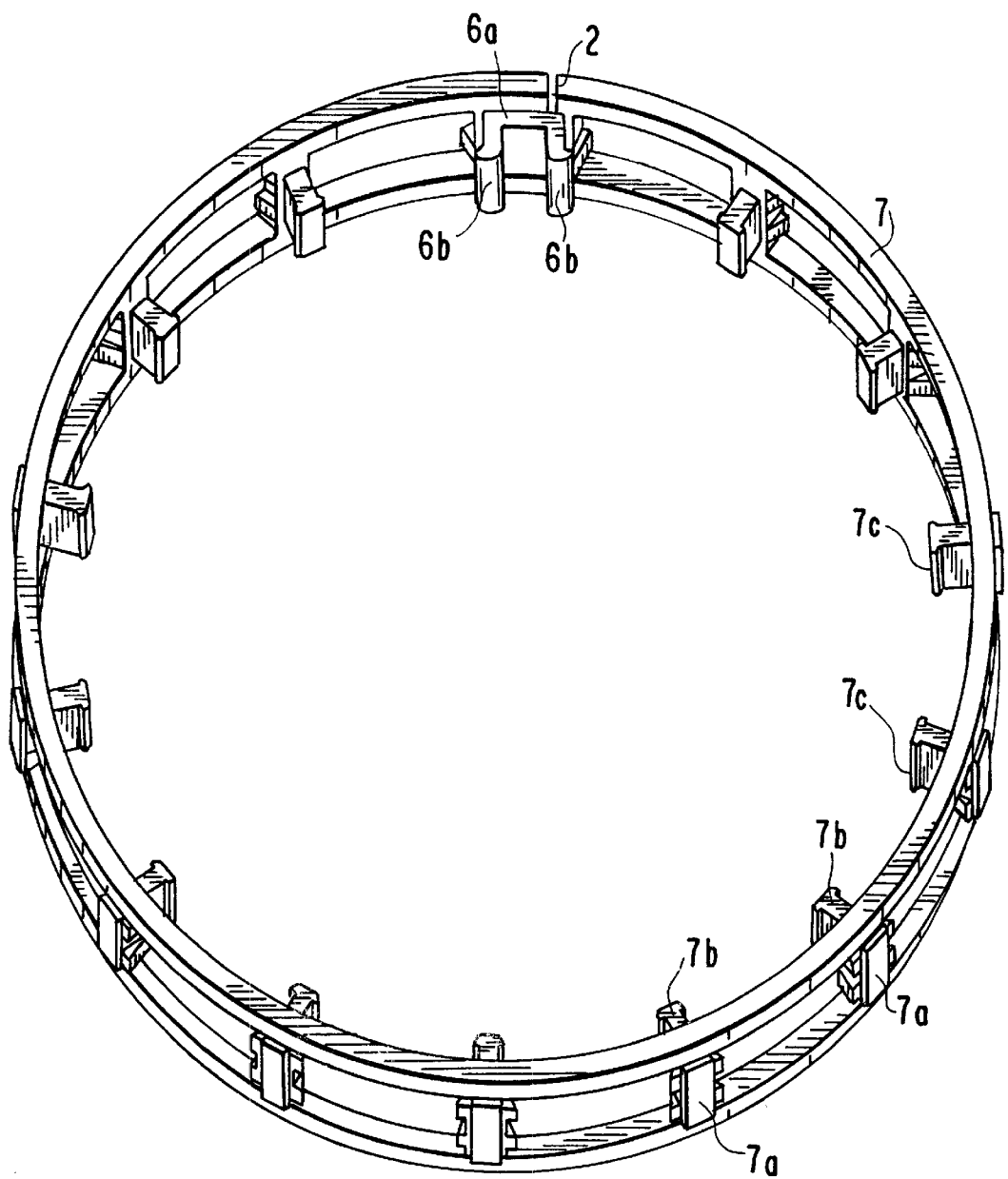
FIG. 6 shows a retainer and clip at the joint between segment ends.

As seen in FIG. 5, the connecting element 6a is a rectangular plate that extends across the lateral width of the space between the lateral side webs or rails 10 of the cage. Other shapes for the connecting element are possible, e.g., even a U-shape, as shown in FIG. 6, so long as it supports the clips 6b.

FIGS. 2 and 5 show the retaining clips 7 in the crosspieces region 9 of the cage 1. At each of the crosspieces 9 between the lateral side webs or rails 10 of the cage, there are two clearances 5 extending radially through the cage adapted to receive a retaining clip 7. Like the connecting element, the retaining clip 7 has a head 7a outside the cage and a radially inwardly projecting portion 7b projecting through the clearances 5 and extending radially inwardly of the cage. Each retaining clip 7 is generally U-shaped, having two pins that project through the clearances 5 and a web at the cage that joins those pins. That clip 7 and its pins may be an integral component or may instead include an outer plastic material plate 7a with pins that pass through that plate or are supported by that outer plate.

The connecting element 6 shown in FIG. 7 has slightly circumferentially outwardly projecting feet 6d. The clips 7 at the crosspieces 9 have similar slightly circumferentially outwardly projecting feet 7c. The small feet 6d and 7c prevent the bearing rollers 8 from falling radially inwardly out of the cage before the cage with rollers is installed to define a bearing.

During assembly of the cage, after the cage segment ends have been brought together, the connecting elements 6 with their clips 6b are installed in the clearances 4 and the retaining clips 7 are installed through the clearances 5.

Following installation of the connecting elements 6a, retaining clips 6b and retaining clips 7, plastic material is molded over the connecting elements and retaining clips, producing a cage structure like that seen in FIG. 6. This firmly secures the connecting elements and retaining clips and prevents their working loose. The radially inwardly projecting clips 6b and 7 that support the rollers are not molded over and are exposed to be contacted by the rollers.

The retaining clips 6b, 7 are dimensioned in such a way that they hold the rollers in the cage to form a structural unit when the cylinder roller bearing is being assembled.

Figure 3:
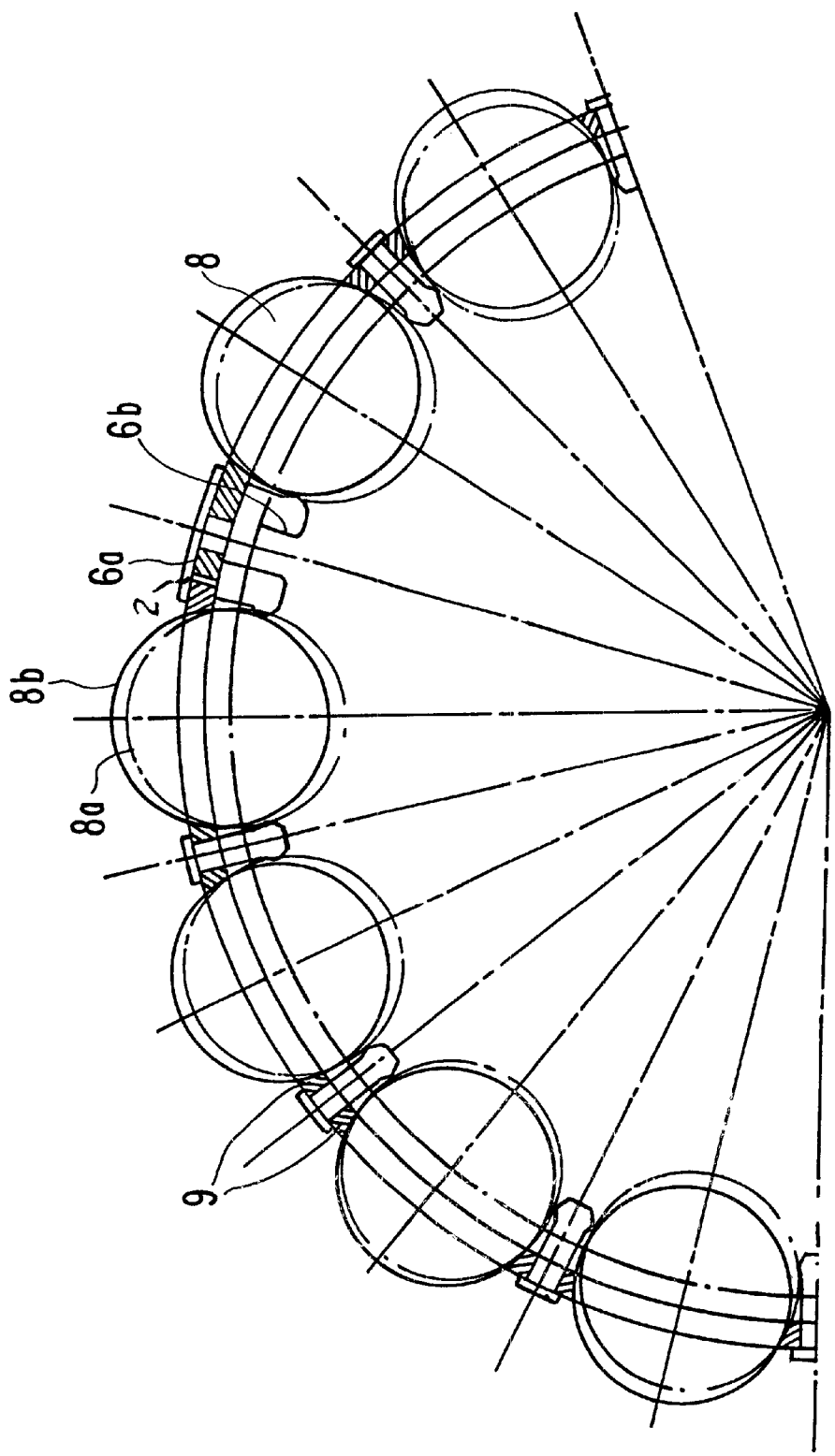
FIG. 3 is the same side view showing two positions of rollers in the bearing.

Two positions of the cylinder rollers 8 of the bearing are shown in FIG. 3. In position 8a during assembly, with rollers 8 radially more inward, the rollers hang downwardly from the then top of the cage, since the inner race of the bearing is then not yet present. These hanging rollers are prevented from falling out of the cage by the retaining clips 6b, 7. This is the case for example when the outer race of a cylindrical roller bearing is fitted with the cage and rollers, but the inner race has not yet been fitted into the bearing or when, for mounting the cylindrical roller bearing onto a shaft, the inner race is pulled out of the bearing. Without these retaining clips, the rollers 8 would fall out of the rolling bearing cage in these situations. During operation in the position 8b for the roller cylinders, with the rollers 8 supported radially more outward, the rollers are guided by the cage crosspieces 9 and the retaining clips 6b and 7 are not subjected to any loading.

Although the present invention has been described in relation to a particular embodiment thereof, many other variations and modifications and other uses will become apparent to those skilled in the art. It is preferred, therefore, that the present invention be limited to not by the specific disclosure herein, but only by the appended claims.

What is claimed is:

1. A metal cage for use in a roller bearing, the cage comprising:

at least one ladder-shaped segment of a window cage, including opposite lateral sides extending along the segment and crosspieces at spaced intervals along the sides to define windows along the segment for guiding bearing rolling elements;

the at least one segment having opposite ends and the cage being normally bent around to define the cage, each of the segment opposite ends is joined to another adjacent one of the opposite ends of the at least one segment at a joint for the ends to define the cage; a connecting element at the joint for connecting the ends;

the cage crosspieces define windows of the cage for guiding rollers in the windows;

the crosspieces and also the joint at the ends of the cage segment are encapsulated with a plastic material along with the respective connecting element.

2. The metal cage of claim 1, further comprising:

first retaining clips on the connecting elements at the joints between adjacent segment ends;

second retaining clips on the crosspieces of the cage away from the joints and away from the retaining clips at the joints;

the first and retaining clips extending radially inwardly of the cage and being shaped to be engaged by bearing rollers disposed in the windows between the crosspieces, and the retaining clips being shaped to retain the bearing rollers in the windows during assembly of the cage, the clips being shaped and positioned as the bearing rolling elements move off the retaining clips that the retaining clips remain unloaded by the bearing rollers.

3. The metal cage of claim 2, wherein the joint between the cage segments ends comprise a respectively complementary shaped dovetail projection from one segment end and a groove in the adjacent segment end to receive the projection; and the ends of the cage segments are held by the connecting element and are then encapsulated by molding over for connecting the cage segment ends.

4. The metal cage of claim 2, wherein the encapsulated connecting element exposes the first retaining clips to be engaged by the rollers;

the cross-pieces also being encapsulated for holding the second retaining clips securely to the cross-pieces, while exposing the second retaining clips to be engaged by the rollers.

5. The metal cage of claim 4, wherein the first and second retaining clips have radially inward regions which are engageable by the rollers.

6. The metal cage of claim 4, wherein the end of one segment has a first clearance for receiving the first retaining clip and the cross-pieces each have a second clearance for receiving the second retaining clip.

7. The metal cage of claim 6, wherein the clearances are sized to retain the respective retaining clips in the cage.

8. The metal cage of claim 4, further comprising a respective bearing roller between neighboring cross-pieces and also between the joint and the cross-pieces next to the joint, wherein the rollers are supportable by the retaining clips.

9. The metal cage of claim 2, further comprising a respective bearing roller between neighboring cross-pieces and also between the joint and the cross-pieces next to the joint, wherein the rollers are supportable by the retaining clips.

* * * * *